(12) United States Patent
Besch et al.

(10) Patent No.: US 7,869,972 B2
(45) Date of Patent: Jan. 11, 2011

(54) METHOD AND SYSTEM FOR SYNCHRONOUS RECTIFICATION

(75) Inventors: Stephen Besch, Buffalo, NY (US); Frederick Sachs, Buffalo, NY (US)

(73) Assignee: The Research Foundation of State University of New York, Amherst, NY (US)

( * ) Notice: Subject to any disclaimer, the term of this patent is extended or adjusted under 35 U.S.C. 154(b) by 0 days.

(21) Appl. No.: 12/602,884

(22) PCT Filed: Jun. 5, 2008

(86) PCT No.: PCT/US2008/065914

§ 371 (c)(1),
(2), (4) Date: Apr. 13, 2010

(87) PCT Pub. No.: WO2008/151279

PCT Pub. Date: Dec. 11, 2008

(65) Prior Publication Data

US 2010/0188101 A1    Jul. 29, 2010

Related U.S. Application Data

(60) Provisional application No. 60/942,022, filed on Jun. 5, 2007.

(51) Int. Cl.
*G01R 35/00* (2006.01)
(52) U.S. Cl. ..................................... 702/106
(58) Field of Classification Search ............... 702/57, 702/60, 64, 65, 77, 106, 182, 183, 189; 375/268; 340/870.04
See application file for complete search history.

(56) References Cited

U.S. PATENT DOCUMENTS

| | | | |
|---|---|---|---|
| 4,225,851 A * | 9/1980 | Reschovsky et al. | ... 340/870.04 |
| 4,600,874 A | 7/1986 | Tupper et al. | |
| 5,381,328 A | 1/1995 | Umezawa et al. | |
| 5,844,193 A | 12/1998 | Nomura et al. | |
| 6,404,655 B1 | 6/2002 | Welches | |
| 6,570,779 B2 | 5/2003 | Shimazaki et al. | |
| 6,604,054 B2 * | 8/2003 | Lipscomb et al. | ............. 702/47 |
| 6,768,284 B2 | 7/2004 | Lee et al. | |
| 6,828,753 B2 | 12/2004 | Grasso et al. | |

OTHER PUBLICATIONS

Fukuda et al.; Introduction of the Harmonic Distortion Determining Factor and Its Application to Evaluating Real Time PWM Inverters; 1995 IEEE Industry Applications, vol. 31, Jan.-Feb. 1995; pp. 149-154.

Lyra et al.; Torque Density Improvement in a Six-Phase Induction Motor with Third Harmonic Current Injection; 2002 IEEE Industry Applications, vol. 38, Sep.-Oct. 2002; pp. 1351-1360.

* cited by examiner

*Primary Examiner*—Mohamed Charioui
(74) *Attorney, Agent, or Firm*—Hodgson Russ LLP

(57) ABSTRACT

The method and system of the present invention uses synchronous rectification and frequency domain analysis to remove the need for calibration of the A/D and D/A components. It is applicable to any sensor based measurement in which either the sensor can be excited with an AC voltage or current, or in which the signal can be modulated with an AC voltage or current.

11 Claims, 2 Drawing Sheets

METHOD AND SYSTEM FOR SYNCHRONOUS RECTIFICATION

CROSS-REFERENCE TO RELATED APPLICATION

This application claims the benefit of priority to U.S. provisional patent application Ser. No. 60/942,022, filed on Jun. 5, 2007, the disclosure of which is incorporated herein by reference.

FIELD OF THE INVENTION

The present invention relates to the use of AC modulated signals in sensor circuits.

BACKGROUND OF THE INVENTION

Sensors are used in many aspects of modern life, from driving a car to getting water from a tap. In a car, for example, sensors may measure the pressure in a fuel rail, the temperature of engine coolant, the oxygen content of exhaust gases, etc. The most common type of sensor is a bridge-type transducer. Bridge-type transducers require an input voltage which is often a constant DC voltage of some known value. For accurate measurement, the input voltage must be as consistent as possible so that it may be factored out of the resulting sensor reading. Unfortunately, the use of such DC input voltages is susceptible to factors including the drift of the sensor components (due to factors such as, for example, temperature) and noise.

The impact of these negative factors may be significantly reduced by the use of an AC input voltage. But the use of AC signals may introduce additional complexities. For example, if the AC signal originates in a computer, a digital-to-analog (D/A) converter must be used in order for the sensor to receive an analog input signal. Additionally, an analog-to-digital (A/D) converter may be used to re-digitize the signal after measurement, for example, to record the data within a computer. Such components as the D/A and A/D convertors generally effect the signal by inducing gains (changes in amplitude). Since sensors generally are read by determining the gain induced by the sensor, additional gains, caused by other components or signal processes, will affect the precision and confidence in any measurements determined from the total gain of the system. Therefore, in order to achieve precise measurements, any additional gains should be factored out (or at least minimized).

Past methods of minimizing these additional gains typically involve calibrating the system through careful measurement of the additional gains caused by the non-sensor components and adjusting the output to compensate for these measured values. This is burdensome, however. Since the gain of a component may change over time, an operator may be required to regularly calibrate the system. This greatly increases the time and cost required to make accurate measurements, as well as requiring high stability A/D and D/A components. Therefore, there is a need for a method of reducing the impact of non-sensor components on sensor measurements without the burdensome efforts required of regularly measuring and compensating for such non-sensor components.

SUMMARY OF THE INVENTION

The method and system of the present invention uses synchronous rectification and frequency domain analysis to remove the need for calibration of the A/D and D/A components. It is applicable to any sensor based measurement in which either the sensor can be excited with an AC voltage or current, or in which the signal can be modulated with an AC voltage or current. It is considered that the use of synchronous rectification as a calibration signal for a transducer excited with an AC current or voltage derives from three observations. First, that rectification transfers all energy from the fundamental frequency into even harmonics of the fundamental frequency; second, that the amplitudes of these even harmonics are precisely related to the amplitude of the fundamental frequency; and third, that if these harmonics are mixed together in a linear fashion, then the specific amplitudes can be independently recovered from the mixed signal, even after having been transmitted (using either a wired or wireless link) to an A/D converter to be converted into digital form.

What this means to the signal processing subsystem is that a "copy" of the excitation signal can be passed along with the transducer's output. This copy will pass through all the same signal pathways that the transducer output is passed through, being increased or decreased by the same proportion. In the final analysis, when the amplitudes of the harmonics have been recovered, simply forming the ratio of the first and second harmonics will reflect only the response of the transducer, exclusive of the amplitude of the excitation signal or any alteration of the composite signal occurring in signal transmission or A/D conversion.

Rectifiers are made up of elements that have a nonsymmetrical behavior. The most common example is a simple semiconductor diode, which passes current easily in one direction (the "forward" direction) but only minimally in the opposite (or "reverse") direction. When applied to a sinusoidal current, the result is current flow during either the positive or negative half cycle of the sine wave, but not both. A single diode therefore produces what is called "half-wave" rectification. Two diodes and a center tapped transformer may be used to achieve rectification of both the positive and negative halves of the waveform to produce "full-wave" rectification. When using diodes alone, four diodes are required, configured in a so-called "bridge" configuration, to properly steer the current and achieve full-wave rectification.

When rectification is used to generate DC power from AC for various purposes, this arrangement is acceptable. However, there is a problem that arises with this scheme owing to an unavoidable characteristic of the diode. For reasons that are related to the physics of the semiconductor junction, a certain minimum voltage is required to cause the flow of current across the junction. This "forward conduction" voltage is generally in the range of 0.6 V for silicon diodes. In addition, current flow is extremely non-linear when voltages are near the forward conduction voltage. For power supplies, this is irrelevant, but for precise rectification of signal waveforms, it is not sufficient.

One way around this dilemma is to steer the positive and negative currents using a series of switches which are activated using very sensitive detectors that determine the precise moment when the input voltage changes from negative to positive and vice versa. These switches can be made to act in an extremely linear and rapid fashion, essentially producing a virtually perfect rectified wave. This process is known as synchronous rectification. The advent of modern integrated electronics has made very high precision, stable and complete implementations of synchronous rectifiers available.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

It is helpful to first review the mathematical relationships involved in synchronous rectification.

Mathematically, synchronous rectification is an implementation of the absolute value function. That is, a rectified sine wave of amplitude A, A sin(t), is A |sin(t)|. To find the amplitudes of the harmonics of this rectified sine wave, the commonly known strategy of Fourier analysis is used; that is, for each harmonic, n, there are two values, $$a_n = \frac{A}{\pi} \int_0^{2\pi} |\sin(t)| \cos(nt) \, dt, \text{ and}$$

$$b_n = \frac{A}{\pi} \int_0^{2\pi} |\sin(t)| \sin(nt) \, dt,$$

from which the amplitudes (and phases) of each harmonic component may be determined using the standard equations for amplitude and phase:

$$\text{Amplitude} = \sqrt{a_n^2 + b_n^2} \text{ and Phase} = \arctan\left(\frac{b_n}{a_n}\right).$$

It can simply be stated that when n=1, $a_n$ and $b_n$ are zero, indicating that there is no first harmonic energy. For the higher order harmonics, the solutions to these integrals are:

$$a_n = \frac{2A}{\pi} \frac{1 + \cos(n\pi)}{1 - n^2} \text{ and } b_n = \frac{2A}{\pi} \frac{\sin(n\pi)}{1 - n^2}.$$

Note that the value of the sine function for all integral multiples of π is exactly zero. That is, the value of $b_n$ is always zero. Thus the phase of the signal is unaffected because the value of arctan($b_n/a_n$) is always zero. The value of $a_n$ is more complicated. It may be somewhat simplified by noting that for all odd integral values of n (odd harmonics), cos(nπ) equals −1, and therefore $a_n$=0. On the other hand, for all even integral values of n (even harmonics), cos (nπ) equals +1 and $a_n$ is given by:

$$a_n = \frac{4A}{\pi(1 - n^2)}.$$

So, for the even integers, $a_n$ will be the sequence:

$$a_n = \frac{-4A}{3\pi}, \frac{-4A}{15\pi}, \frac{-4A}{35\pi}, \ldots n = 2, 4, 6, \ldots$$

Note the rapidly decreasing amplitudes of the higher harmonics. Since the second harmonic is the largest, it may be preferably used as the calibration signal. Other even harmonics may be used and the harmonics may be used together (added together).

Figure 1:
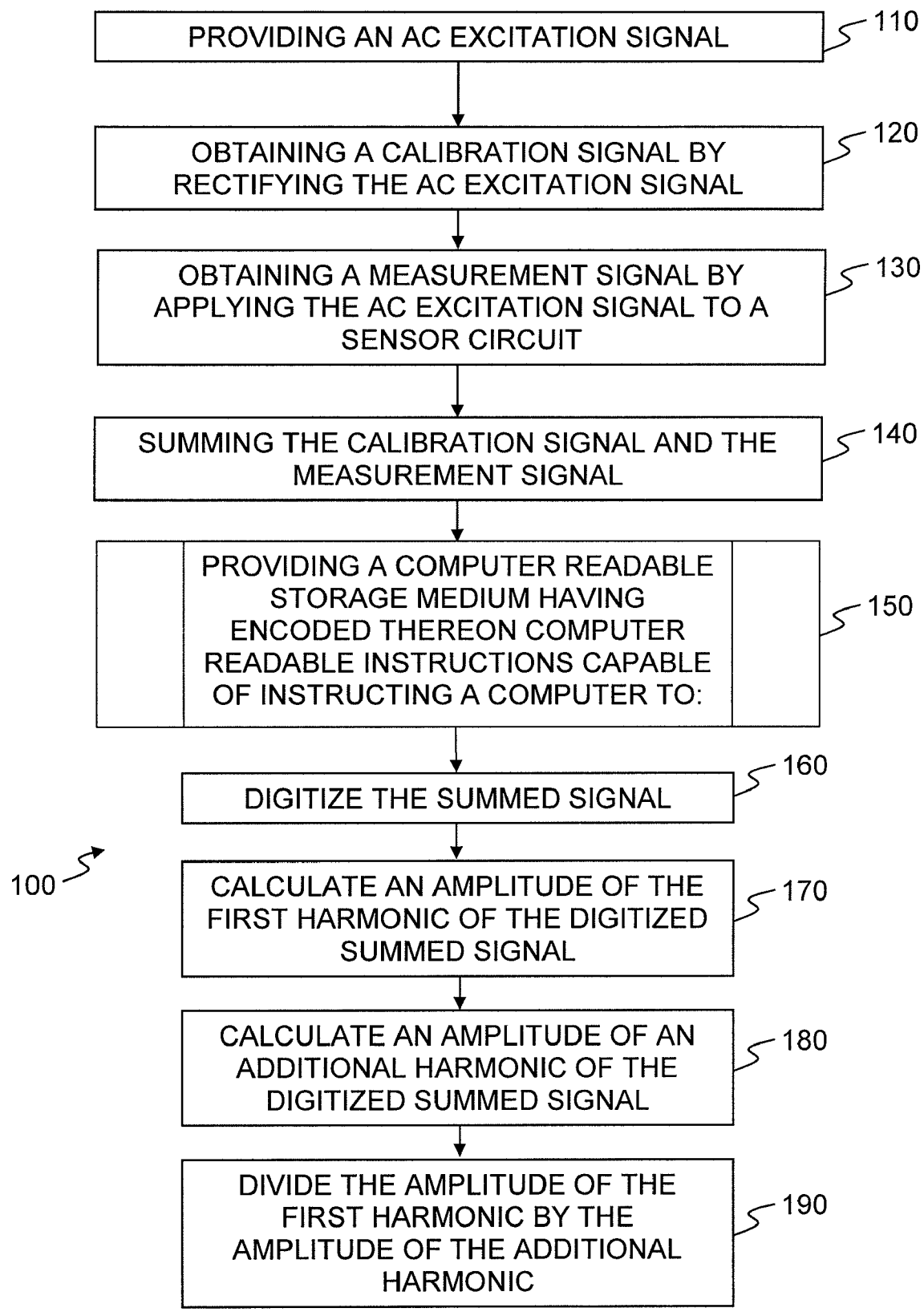
FIG. 1 is a flow chart depicting a method according to an embodiment of the present invention.

FIG. 1 depicts a method 100 according to the present invention in which an AC excitation signal may be provided 110. The AC excitation signal may be generated using D/A conversion methods. The specific frequency is unimportant as long as subsequent processing steps are capable of handling the excitation frequency and its second harmonic in a predictable and linear way. As a non-limiting example, the frequency must not be so high as to exceed the capabilities of any analog-to-digital and digital-to-analog components used. Specifically, the choice of frequency is determined by other design factors which depend upon the specific implementation. The AC excitation signal's amplitude is determined only on the basis of the specific implementation of the method. Once the AC excitation signal is generated at some amplitude, A, it is applied simultaneously to two distinct components of the system. It will be represented here as A sin (ωt), where ω is the frequency in radians per second. For mathematical purposes, the signal is taken as having zero phase shift at this point.

The AC excitation signal is passed 120 through a synchronous rectifier to remove first harmonic energy and to introduce the second and higher harmonics at amplitudes proportional to the amplitude of the calibration voltage. The result of this rectification is the calibration signal. Any even harmonic may be used, but preferably the second harmonic is used because the second harmonic has the most energy of the even harmonics. The method will be further described using the second harmonic; however, this is intended to be non-limiting as it has been established that any even harmonic may be used. In the second harmonic, the amplitude of the calibration signal is taken as being exactly equal to 4A/3π. Rectification introduces no phase shift, so it will be represented here simply as 4A sin(ωt)3π, thus ignoring all higher harmonic components.

The AC excitation signal is simultaneously passed 130 through a sensor circuit, which modifies its amplitude and phase in proportion to the sensor circuit's known transfer function. The resulting output voltage (measurement signal) from the sensor circuit is thus given by $G_t(u)A \sin(\omega t+\phi)$, where $G_t(u)$ and φ are, respectively, the sensor circuit's gain and phase shift at the given excitation frequency, and u is the intensity of a physical characteristic to which the sensor circuit is sensitive (i.e., temperature, pressure, conductivity, etc.). The measurement signal and the calibration signal are then summed 140 and digitized 150, 160 by applying the summed signal to an A/D converter, preferably within a computer. Additional gains, $G_s$ and $G_a$, may be imposed by the summing process and by the A/D converter, respectively. Digitization will then result in a sampled waveform which may be described as:

$$G_t(u)G_sG_aA\sin(\omega t + \phi) + G_sG_a\frac{4A}{3\pi}\sin(2\omega t).$$

Since the exact frequency is known, the sine and cosine products for both the first and second harmonics may be computed, and from these, the respective amplitudes, $G_t(u) G_sG_aA$ and $G_sG_a4A/3\pi$, may be recovered 170, 180 using frequency analysis techniques commonly known in the art. If needed, the phase shifts of the various components may also be calculated; preferably, however, the various components are synchronously driven (driven by the same clock) such that all signals are in phase and no phase shift calculations are necessary.

The ratio of the first and second harmonic amplitudes is formed 190, with the result being simply $$\frac{3\pi}{4} G_t(u),$$

from which the specific value of u (temperature, pressure, conductivity, etc.) can be calculated using the known transfer function of the transducer.

Figure 2:
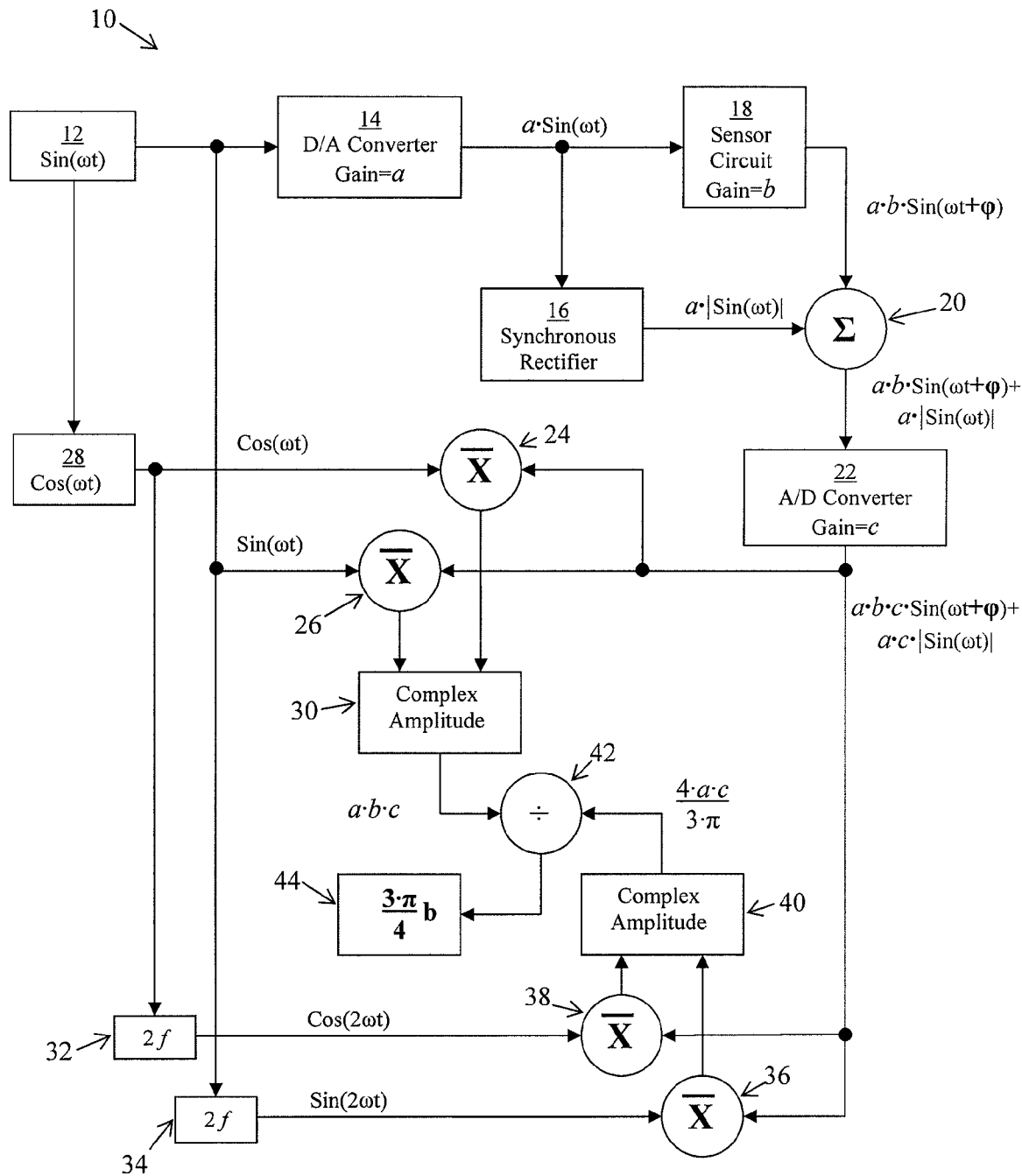
FIG. 2 is a block diagram of a system according to another embodiment of the current invention.

Referring now to FIG. 2, another embodiment of the present invention is shown in which the invention is embodied as a system 10. An AC excitation signal generator 12 generates a sine wave of frequency $\omega$. The AC excitation signal generator 12 is shown here as a digital component and a D/A converter 14 may be used to convert the AC excitation signal to analog form. The D/A converter 14 may have a gain, and the net gain is represented as "a." An output from the D/A converter 14 is used to excite a sensor circuit 18 in such a way as to modulate an output voltage of the sensor circuit 18. The output voltage of the sensor circuit 18 is then a sinusoidal voltage of frequency $\omega$, whose amplitude is a function of the sensed property (pressure, resistance, etc.) and the excitation amplitude, specifically, $a \cdot b \cdot \sin(\omega t + \phi)$, where the gain and phase shift of the sensor's transfer function are represented by "b" and "$\phi$", respectively (the measurement signal).

The D/A converter 14 output is also passed through a synchronous rectifier 16 and synchronously rectified to produce a voltage $a \cdot |\sin(\omega t)|$. As shown above, this rectified voltage (calibration signal) contains only even harmonic (2$\omega$, 4$\omega$, etc.) energy. The measurement signal and the calibration signal are then summed in a circuit 20 to create the summed signal, and the summed signal is fed into an A/D converter 22. The result is a digitized summed signal that is scaled by the input gain of the A/D converter, represented as "c": $a \cdot b \cdot c \cdot \sin(\omega t + \phi) + a \cdot c \cdot |\sin(\omega t)|$. The A/D converter 22 may be implemented in a computer, for example, using a standard "line in" port and associated A/D converter in the sound subsystem of a computer. Similarly, the signal generator 12 and D/A converter 14 may be implemented in a computer, for example, using a standard "line out" port and associated D/A converter in the sound subsystem of a computer.

Computer readable media may be provided containing instructions to instruct a computer to calculate a cosine signal 28 represented as $\cos(\omega t)$. Instructions 24, 26, 30 may be provided to use frequency analysis techniques commonly known in the art to determine the amplitude of the first harmonic of the digitized summed signal. Similarly, instructions 32, 34, 36, 38, 40 may be provided to calculate the second harmonic of the digitized summed signal. As shown above, the amplitudes of the first and second harmonics are $a \cdot b \cdot c$ and $4 \cdot a \cdot c / 3\pi$, respectively. Instructions 42 may be provided to divide the amplitudes to obtain the value of the sensor output function, "b", scaled by the constant $3/4\pi$. Additional instructions may be provided to correct for the constant $3/4\pi$ to obtain the value of the sensor output function "b" alone.

Although the present invention has been described with respect to one or more particular embodiments, it will be understood that other embodiments of the present invention may be made without departing from the spirit and scope of the present invention.

What is claimed is:

1. A method for auto-calibrated measurement using an AC modulated sensor, comprising the steps of:

providing an AC excitation signal;

obtaining a calibration signal by rectifying the AC excitation signal;

obtaining a measurement signal by applying the AC excitation signal to a sensor circuit;

summing the calibration signal and the measurement signal;

providing a computer readable storage medium having encoded thereon computer readable instructions capable of instructing a computer to:

digitize the summed signal;

calculate an amplitude of the first harmonic of the digitized summed signal;

calculate an amplitude of an additional harmonic of the digitized summed signal wherein the additional harmonic is selected from any of the even harmonics of the summed signal; and divide the amplitude of the first harmonic by the amplitude of the additional harmonic to obtain an auto-calibrated measurement.

2. The method of claim 1 wherein the additional harmonic is the second harmonic of the digitized summed signal.

3. The method of claim 1 wherein the AC excitation signal is rectified by applying the AC excitation signal to a synchronous rectifier.

4. The method of claim 1 wherein the sensor circuit is a bridge-type transducer.

5. The method of claim 1 wherein the sensor circuit alters the amplitude of the AC excitation signal in proportion to a physical characteristic selected from the group consisting of temperature, pressure, brightness, strain, resistivity, and conductivity.

6. The method of claim 1 further comprising the step of correcting the auto-calibrated measurement by a transfer function of the sensor circuit.

7. A system for auto-calibrated measurement using an AC modulated sensor, comprising:

a signal generator wherein the signal generator provides an AC excitation signal;

a synchronous rectifier wherein the synchronous rectifier rectifies the AC excitation signal to generate a calibration signal;

a sensor circuit wherein the sensor circuit generates a measurement signal in response to a measured characteristic and when the AC excitation signal is applied to the sensor circuit;

a summing circuit wherein the measurement signal and the calibration signal are combined into a summed signal;

a computer having an input wherein the summed signal is applied to the input;

a computer readable storage medium having encoded thereon computer readable instructions capable of instructing a computer to:

digitize the summed signal;

calculate an amplitude of the first harmonic of the digitized summed signal;

calculate an amplitude of an additional harmonic of the digitized summed signal wherein the additional harmonic is selected from any of the even harmonics of the summed signal; and divide the amplitude of the first harmonic by the amplitude of the second harmonic to obtain an auto-calibrated measurement.

8. The system of claim 7 wherein the additional harmonic is the second harmonic of the summed signal.

9. The system of claim 7 wherein the AC excitation signal is rectified by applying the AC excitation signal to a synchronous rectifier.

10. The system of claim 7 wherein the sensor circuit is a bridge-type transducer.

11. The system of claim 7 wherein the sensor circuit alters the amplitude of the AC excitation signal in proportion to a physical characteristic selected from the group consisting of temperature, pressure, brightness, strain, resistivity, and conductivity.

* * * * *